United States Patent
Hey et al.

(10) Patent No.: US 9,852,049 B2
(45) Date of Patent: Dec. 26, 2017

(54) SCREENSHOT VALIDATION TESTING

(71) Applicant: International Business Machines Corporation, Armonk, NY (US)

(72) Inventors: Laurence A. Hey, Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 14/287,560

(22) Filed: May 27, 2014

(65) Prior Publication Data
US 2015/0347284 A1 Dec. 3, 2015

(51) Int. Cl.
G06F 9/44 (2006.01)
G06F 11/36 (2006.01)
H04L 29/08 (2006.01)
H04L 29/14 (2006.01)

(52) U.S. Cl.
CPC ...... *G06F 11/3668* (2013.01); *G06F 11/3664* (2013.01); *G06F 11/3692* (2013.01); *H04L 67/02* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 6,701,514 B1 * | 3/2004 | Haswell | G06F 11/3664 707/999.102 |
| 9,122,943 B1 * | 9/2015 | Muszynski | G06K 9/033 |
| 9,200,897 B1 * | 12/2015 | Wilson | G01B 21/00 |
| 9,213,625 B1 * | 12/2015 | Schrage | G06F 11/3688 |
| 2006/0020597 A1 * | 1/2006 | Keating | G06F 17/3025 |
| 2007/0118821 A1 * | 5/2007 | Yee | G06T 11/206 715/864 |
| 2009/0112830 A1 * | 4/2009 | Denoue | G06F 17/30265 |

(Continued)

OTHER PUBLICATIONS

Cox, James, "Using Page Objects with Selenium and Web Driver 2.0", Oct. 10, 2011, Summa, <http://www.summa-tech.com/blog/2011/10/10/using-page-objects-with-selenium-and-web-driver-20/>.

(Continued)

*Primary Examiner* — Insun Kang
(74) *Attorney, Agent, or Firm* — Christopher McLane; Edward J. Wixted

(57) ABSTRACT

Embodiments of the present invention disclose a method, computer program product, and system for comparing screenshots of an application interface. In one embodiment, the method includes receiving test scenario parameters, wherein the parameters include a first screenshot of an application interface, one or more page objects associated with the first screenshot, generating a second screenshot of an updated application interface, identifying one or more page objects within the second screenshot based on a scope of each of the page objects associated with the first screenshot, comparing a section of the second screenshot to a section of the first screenshot that includes one or more page objects associated with the first screenshot that correspond to one or more page objects included in the section of the second screenshot, and determining whether the section of the second screenshot matches, within a predetermined tolerance level, the section of the first screenshot.

13 Claims, 8 Drawing Sheets

(56) References Cited

U.S. PATENT DOCUMENTS

| | | | |
|---|---|---|---|
| 2010/0146488 A1* | 6/2010 | Chen | G06F 17/30905 717/128 |
| 2011/0231823 A1* | 9/2011 | Fryc | G06F 11/3688 717/125 |
| 2011/0276946 A1 | 11/2011 | Pletter | |
| 2011/0289489 A1* | 11/2011 | Kumar | G06F 11/3664 717/135 |
| 2012/0150820 A1* | 6/2012 | Sankaranarayanan | G06F 17/30303 707/690 |
| 2012/0243745 A1 | 9/2012 | Amintafreshi | |
| 2012/0246515 A1 | 9/2012 | Lusenhop et al. | |
| 2013/0004087 A1 | 1/2013 | Kumar et al. | |
| 2013/0212461 A1* | 8/2013 | Sarangapani | G06F 11/3608 715/234 |
| 2013/0263098 A1* | 10/2013 | Duda | G06F 11/3664 717/134 |
| 2013/0287305 A1* | 10/2013 | Dhanda | G06F 17/3089 382/218 |
| 2013/0332905 A1 | 12/2013 | Vikutan et al. | |
| 2014/0007002 A1* | 1/2014 | Chang | G06F 3/04883 715/780 |
| 2014/0105491 A1* | 4/2014 | Hayek | G06K 9/6202 382/165 |
| 2014/0237455 A1* | 8/2014 | Koneru | G06F 11/3688 717/131 |
| 2015/0067469 A1* | 3/2015 | Shuto | G06F 17/241 715/232 |
| 2015/0082280 A1* | 3/2015 | Betak | G06F 11/3692 717/124 |

OTHER PUBLICATIONS

Udgata, S.K. et al., "Regression Based Automated Test Tool for Web Portals", 2008 IEEE Region 10 Conference, Nov. 19-21, 2008, E-ISBN 978-1-4244-2409-2 <http://ieeexplore.ieee.org/xpl/articleDetails.jsp?tp=&arnumber=4766818&searchWithin%3DWeb+Page%26queryText%3DAutomated+Test>.

"Test Design Considerations", SeleniumHQ Browser Automation, <http://www.seleniumhq.org/docs/06_test_design_considerations.jsp>, copyright 2008-2012, last updated on Mar. 4, 2014.

Hey, et al., "Screenshot Validation Testing", U.S. Appl. No. 14/607,168, filed Jan. 28, 2015.

List of IBM Patents of Patent Applications Treated as Related, Jan. 27, 2015.

* cited by examiner

SCREENSHOT VALIDATION TESTING

FIELD OF THE INVENTION

The present invention relates generally to the field of software testing, and more particularly to comparison testing of screenshots.

BACKGROUND OF THE INVENTION

The World Wide Web is a major delivery platform for Web development consisting of complex and sophisticated applications with multifaceted functionality and complex behavior. Web development is a broad term for the work involved in developing a website for the Internet (World Wide Web) or an intranet (a private network). Web development can range from developing a static single page of plain text to a complex Web-based Internet application. Each webpage can contain numerous types of information: perceived or rendered (e.g., text, graphics, audio, interactive), internal or hidden (e.g., comments, linked files, metadata, style information, scripts), and adapted information elements (dependent upon the browser or end-user location).

Web testing tools evaluate a designed webpage for scripting requirements, graphical user interface (GUI) functionalities, and/or browser compatibility. Some types of tests or techniques utilized to evaluate a designed webpage are: Data Driven Testing (DDT) (i.e., a test that uses the same test, or tests, multiple times with varying data), database validation (i.e., comparing data in the User Interface (UI) against data stored in a database), functional testing (i.e., checking to ensure a webpage or application responds as anticipated), and layout testing (i.e., a test to determine whether visual aspects of a webpage are correct). Layout testing is a visual comparison of webpages performed by utilizing screenshots. A screenshot is an image taken by recording visible items displayed on a visual output device. Layout testing is achieved by capturing an initial image that is the basis for which subsequent test images are to be compared.

SUMMARY

Embodiments of the present invention disclose a method, computer program product, and system for comparing screenshots of an application interface. In one embodiment, in accordance with the present invention, the method includes receiving parameters of a test scenario, wherein the parameters include a first screenshot of an application interface, and one or more page objects associated with the first screenshot. The method further includes generating a second screenshot of an updated version of the application interface. The method further includes identifying one or more page objects within the second screenshot based on a scope of each of the one or more page objects associated with the first screenshot in the parameters of the test scenario. The method further includes comparing a section of the second screenshot that includes the identified one or more page objects of the second screenshot to a section of the first screenshot that includes one or more page objects associated with the first screenshot that correspond to the one or more page objects included in the section of the second screenshot. The method further includes determining whether the section of the second screenshot matches, within a predetermined tolerance level, the section of the first screenshot.

DETAILED DESCRIPTION

Embodiments of the present invention recognize that the World Wide Web is a major delivery platform for Web development consisting of complex and sophisticated applications with multifaceted functionality and complex behavior. In addition to running executable code on a local computer, users also interact with online applications from any location to create new content. Webpages continue to be developed and require thorough testing to ensure usability, maintainability, quality, and reliability. Functional tests validate specific webpage functions that utilize browser-supported user inputs (e.g., text-input fields, check boxes, drop-down lists) and verify appropriate corresponding results. Each element within a webpage typically has an associated unique identifier that is used to indicate a unique location of that element within the webpage. Elements contained within a webpage can be static elements (e.g., unchanging, string constant) or dynamically generated elements (i.e., elements containing values that vary within each instance of the webpage). Due to the complex nature of a webpage and the verification testing needing to be performed, as recognized by the embodiments of this invention, tests that are currently time consuming and inflexible are addressed, thus increasing the reliability, independence, and flexibility of a webpage.

Embodiments of the present invention create the ability for partial areas of a webpage to be selected and validated automatically. Embodiments of the present invention also omit areas identified as irrelevant to the testing, which if included may result in a failure of the test. Additionally, embodiments of the invention account for variances in test pages encountered between different computer systems, webpage browsers, and within test environments which would typically result in failure of the test.

Figure 1:
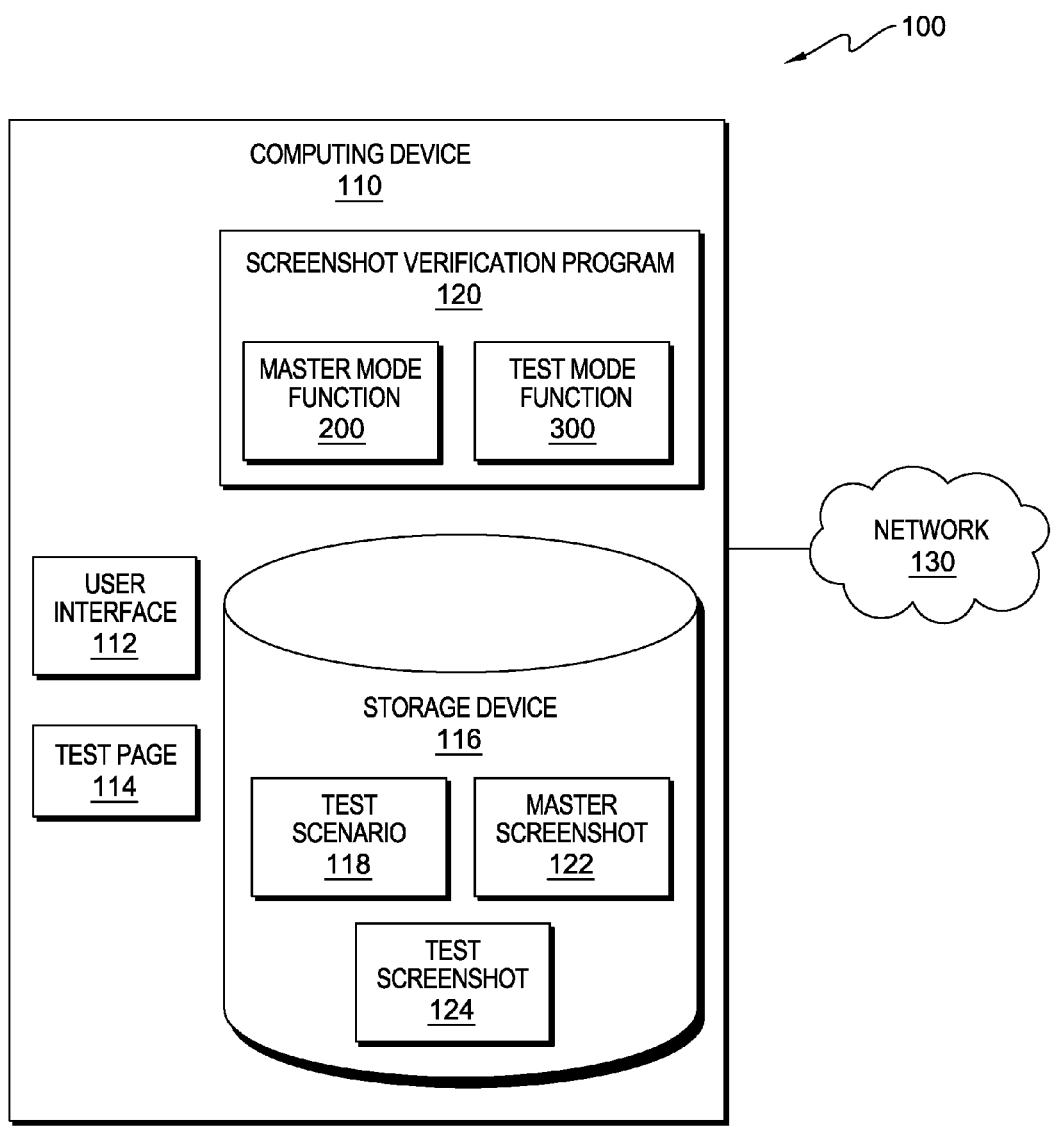
FIG. 1 is a block diagram illustrating a computing system, in accordance with an embodiment of the present invention.

FIG. 1 depicts a diagram of computing system 100, in accordance with one embodiment of the present invention. FIG. 1 provides only an illustration of one embodiment and does not imply any limitations with regard to the environments in which different embodiments may be implemented.

In the depicted embodiment, computing system 100 includes computing device 110 and network 130. Computing system 100 may include additional computing devices, servers, computers, storage devices, or other devices not shown. Network 130 may be a local area network (LAN), a wide area network (WAN), such as the Internet, any combination thereof, or any combination of connections and protocols that will support communications between computing device 110 and other computing devices (not shown), in accordance with embodiments of the invention. Network 130 may include wired, wireless, or fiber optic connections.

Computing device 110 may be a Web server, or any other electronic device or computing system, capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 130. In other embodiments, computing device 110 may represent a server computing system utilizing multiple computers as a server system, such as in a cloud computing environment. In general, computing device 110 is representative of any electronic device or combination of electronic devices capable of executing machine-readable program instructions, as described in greater detail with regard to FIG. 5, in accordance with embodiments of the present invention. Computing device 110 contains screenshot verification program 120, master mode function 200, test mode function 300, user interface 112, test page 114, storage device 116, test scenario 118, master screenshot 122, and test screenshot 124. Computing device 110 may include components as depicted and described in further detail with respect to FIG. 5.

User interface 112 operates on computing device 110 to generate display signals corresponding to content, such as windows, menus, and icons, and to receive various forms of user input. In one embodiment, user interface 112 comprises an interface to test scenario 118. User interface 112 may display data received from test scenario 118 and screenshot verification program 120. User interface 112 may send input to test scenario 118 and screenshot verification program 120. User interface 112 may comprise one or more interfaces, such as an operating system interface and/or an application interface.

In some embodiments, test page 114 may be any webpage accessed through network 130. In other embodiments, test page 114 may be any application which contains an application programming interface (API) and is contained within a computing device, such as computing device 110. Test page 114 may be accessed through user interface 112 of computing device 110 or through a user interface of another computing device over network 130. Information on test page 114 includes one or more page objects. Page objects are models of areas within a webpage application that interact with a user (e.g., via user interface 112) or test (e.g. test scenario 118). Additionally, screenshot verification program 120, master mode function 200, and test mode function 300, each access and utilize page objects and corresponding information on test page 114, as identified in test scenario 118. In one embodiment, test page 114 resides on computing device 110. In other embodiments, test page 114 may reside on another server or another computing device provided that test page 114 is accessible to test scenario 118, master mode function 200, and test mode function 300.

Storage device 116 can be implemented with any type of storage device that is capable of storing data that may be accessed and utilized by computing device 110. Value structures for data structure instances may be stored to storage device 116. In one embodiment, storage device 116 resides on computing device 110. In other embodiments, storage device 116 may reside on another server or another computing device connected over network 130, provided that storage device 116 is accessible to computing device 110. Storage device 116 includes test scenario 118, master screenshot 122, and test screenshot 124.

Test scenario 118 can be written in any computer language; for example, test scenario 118 could be written in C++ or another programming language. A test scenario is a repeatable automated procedure comprised of a series of operations and test cases. Test cases represent actions made by a user or program in the form of inputs and outputs (e.g., input values, execution preconditions, executed post conditions) and are provided to a system (e.g., computing device, webpage, application, program). User interface 112 initiates automated test scenario 118. Test scenario 118 consists of a series of executable commands to access and update test page 114 and execute screenshot verification program 120. Test scenario 118 may contain information regarding scope and page objects. The scope is an area within a webpage that can be defined by a test scenario which identifies the outer bounds of page objects. Page objects are models of areas within a webpage application that interact with a user or test. In some embodiments, test scenario 118 identifies page objects and an associated scope to screenshot verification program 120 for data collection and comparison. In other embodiments, test scenario 118 identifies some page objects and an associated scope to screenshot verification program 120, creating a partial screenshot. A partial screenshot is a section or portion of a full screenshot, containing one or more page objects, as identified by test scenario 118. Screenshot verification program 120 excludes unidentified page objects from data collection and comparison. In some other embodiments, test scenario 118 identifies a continuously updating dynamic page object (e.g. time and date stamp) to screenshot verification program 120 to exclude from data collection and comparison. A dynamic page object has the capability to change value independent of user input based upon a webpage function. Depending upon which function, master mode function 200 or test mode function 300, is activated by user interface 112, results obtained from screenshot verification program 120 are stored within storage device 116 as master screenshot 122 or test screenshot 124, respectively. Upon completion, screenshot verification program 120 determines success or failure of a test scenario, such as test scenario 118, based on whether a webpage, application, or feature is working as designed.

In the depicted embodiment, screenshot verification program 120 includes master mode function 200 and test mode function 300. Master mode function 200, explained in greater detail in regards to FIG. 2, performs the selection and data capture of control data (e.g., master screenshot 122) identified by test scenario 118. Control data is collected data recognized as the approved baseline for a specific test scenario. Control data is stored for future comparison to test data to evaluate the success or failure of newly acquired results after repeating execution of the same test scenario but with changes to the data collected. In some embodiments master mode function 200 stores page objects and coordinates in storage device 116 as part of master screenshot 122. In embodiments of the present invention, test mode function 300 utilizes master screenshot 122 as control data.

Figure 3:
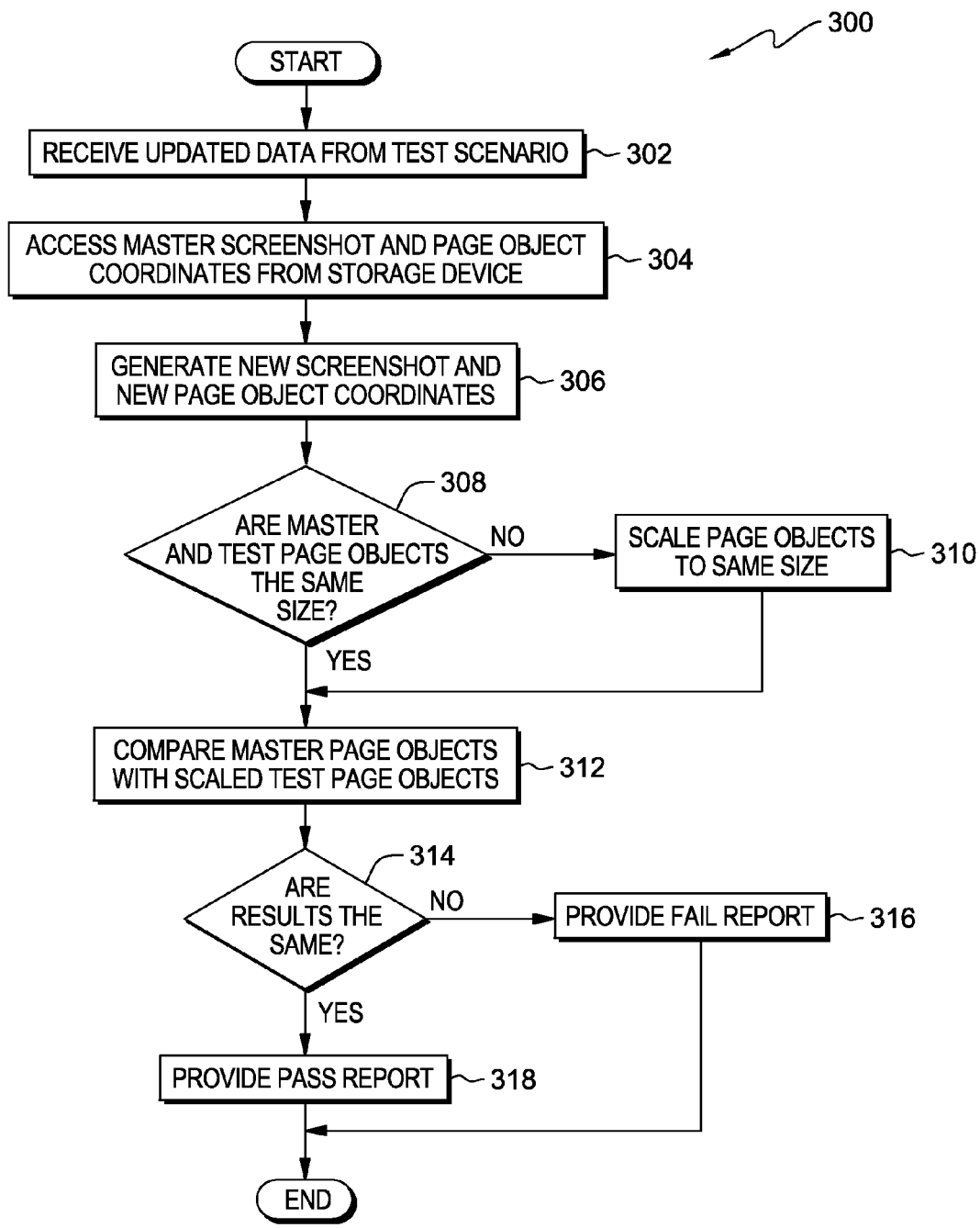
FIG. 3 is a flowchart depicting operational steps of a test mode of a screenshot verification program within the computing system of FIG. 1, for generating data to be verified against data collected by FIG. 2, in accordance with an embodiment of the present invention.

Test mode function 300, explained in greater detail in regards to FIG. 3, performs the selection and capture of updated conditions identified by test scenario 118, placed in storage device 116 and stored as test screenshot 124.

Updated conditions refer to changes made to initial conditions that may or may not result in variances between control data (e.g., master screenshot 122) and test data (e.g., test screenshot 124). Updated conditions include, but are not limited to, changes made to the format or content, contained or displayed, by a webpage. For example, updated conditions may include changes in the user environment (e.g., new browser version), changes to the structure, design, or format of a webpage, or changes in the website environment (e.g., server operating system, database). In embodiments of the present invention, test screenshot 124 is the data to be validated against the control data stored within master screenshot 122.

Figure 4A:
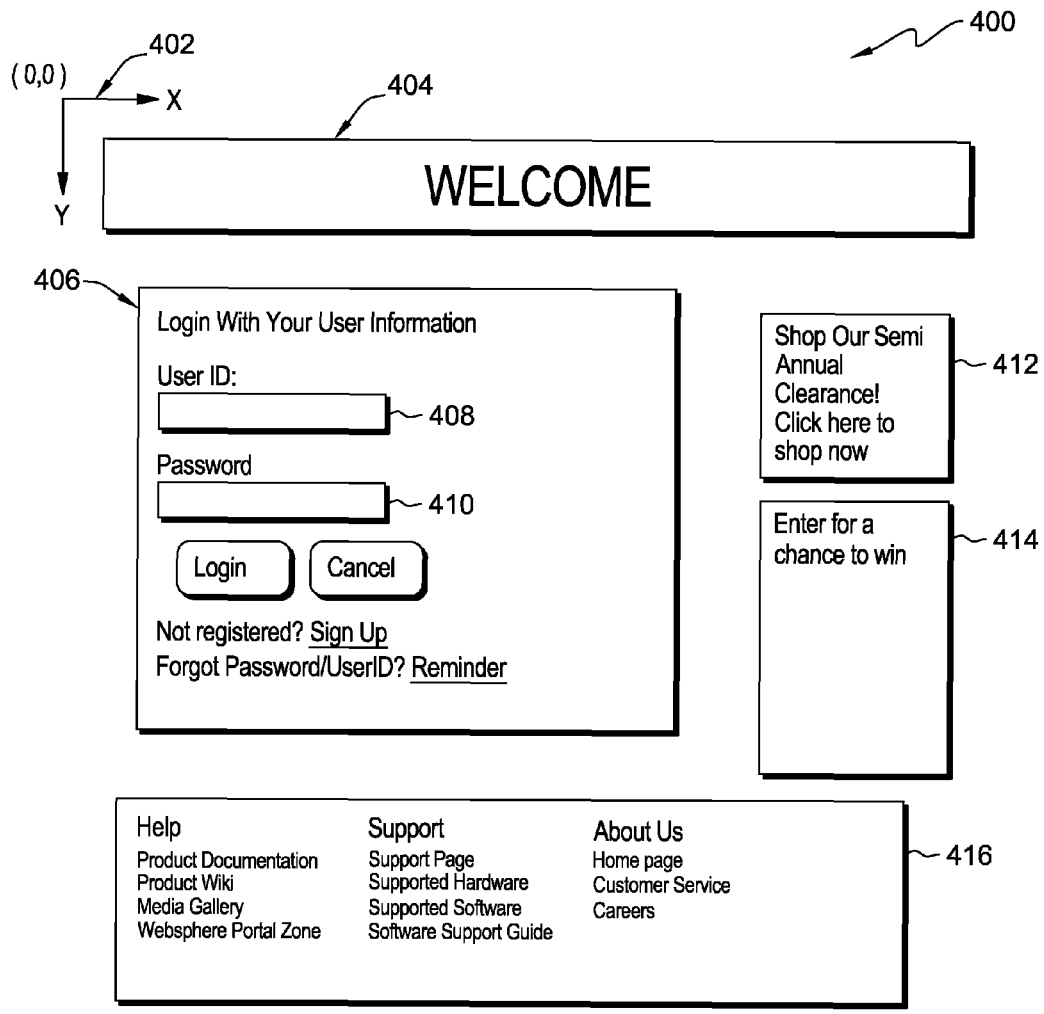
FIG. 4A depicts an example master screenshot, in accordance with an embodiment of the present invention.
Figure 4B:
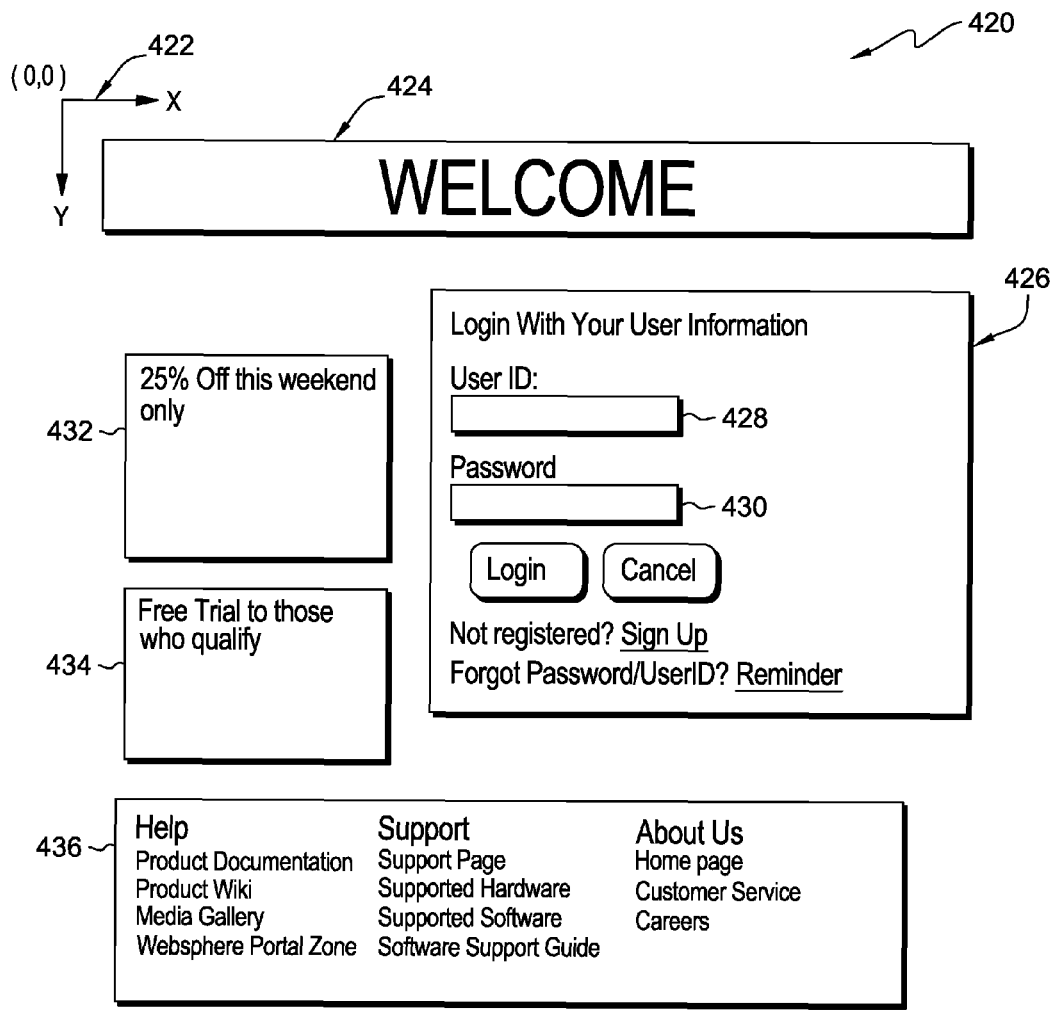
FIG. 4B depicts an example test screenshot with changes to scaling and location, in accordance with an embodiment of the present invention.
Figure 4C:
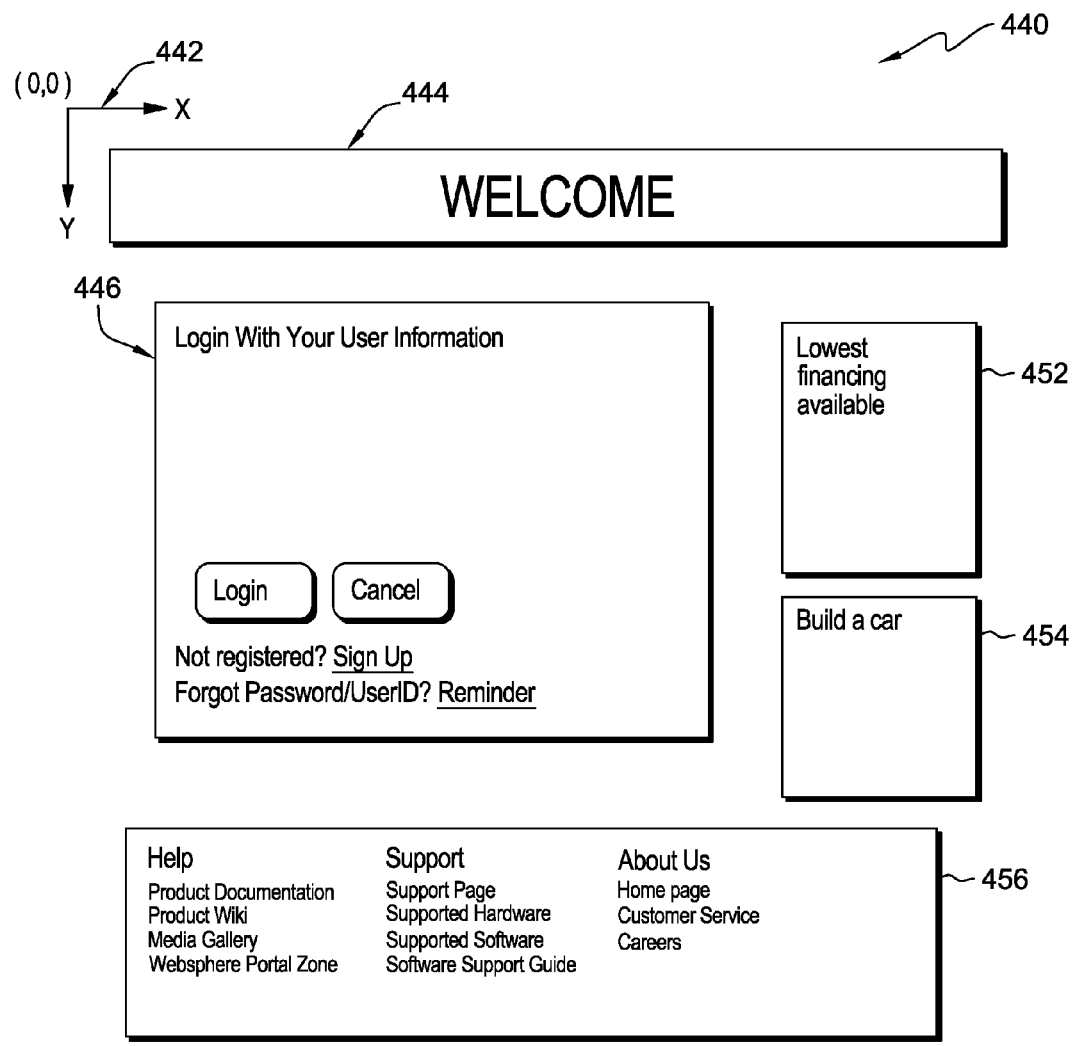
FIG. 4C depicts an example test screenshot with changes and missing page objects, in accordance with an embodiment of the present invention.
Figure 4D:
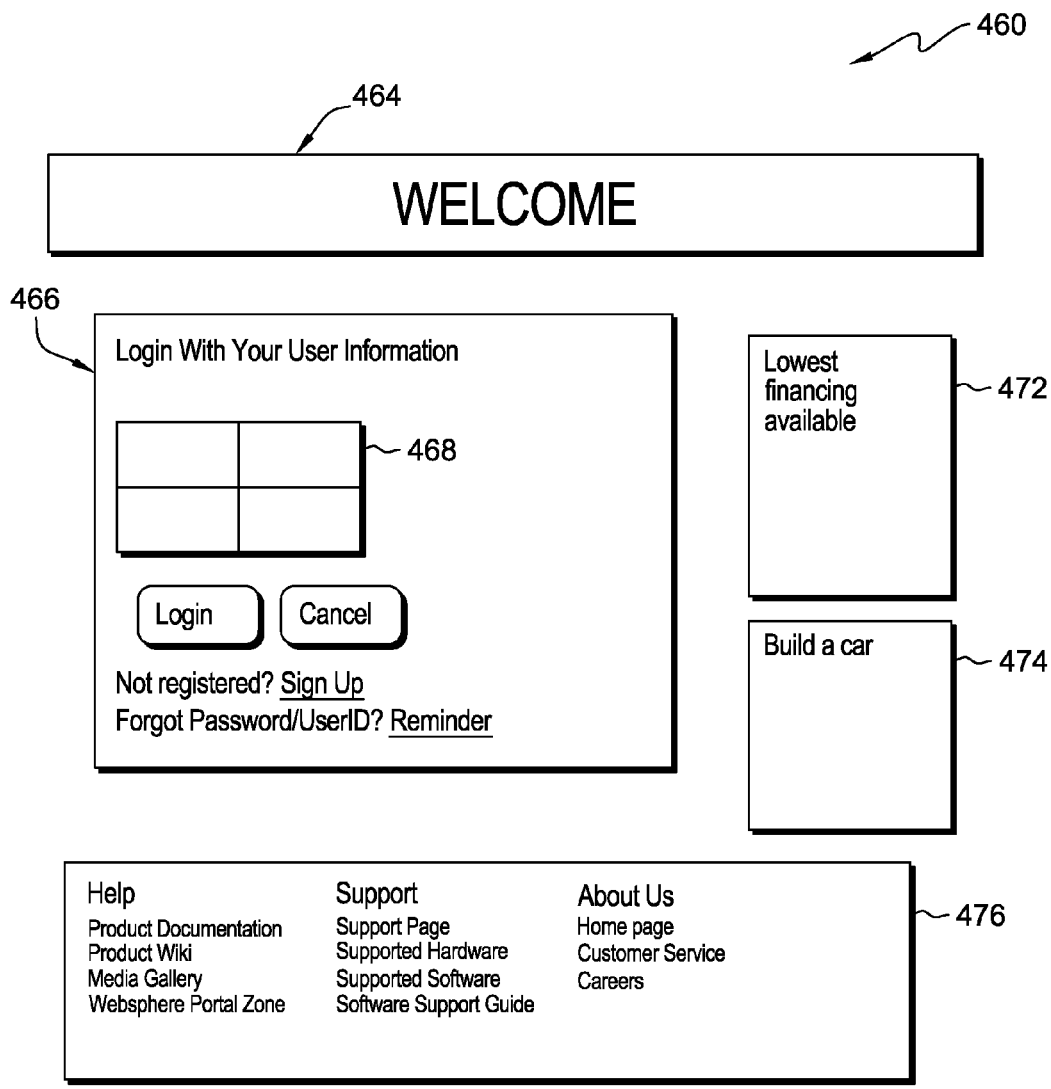
FIG. 4D depicts an example screenshot failure report, in accordance with an embodiment of the present invention.

An example embodiment of the invention is depicted and discussed in FIG. 4A-4D. FIG. 4A, example master screenshot 400, depicts a potential master screenshot 122 of a webpage. FIG. 4B, example test screenshot 420, depicts a potential test screenshot 124 of an updated webpage and a pass report. FIG. 4C, example test screenshot 440, depicts a different possible test screenshot of another updated webpage. FIG. 4D, example failure report 460, depicts a failure report.

Figure 2:
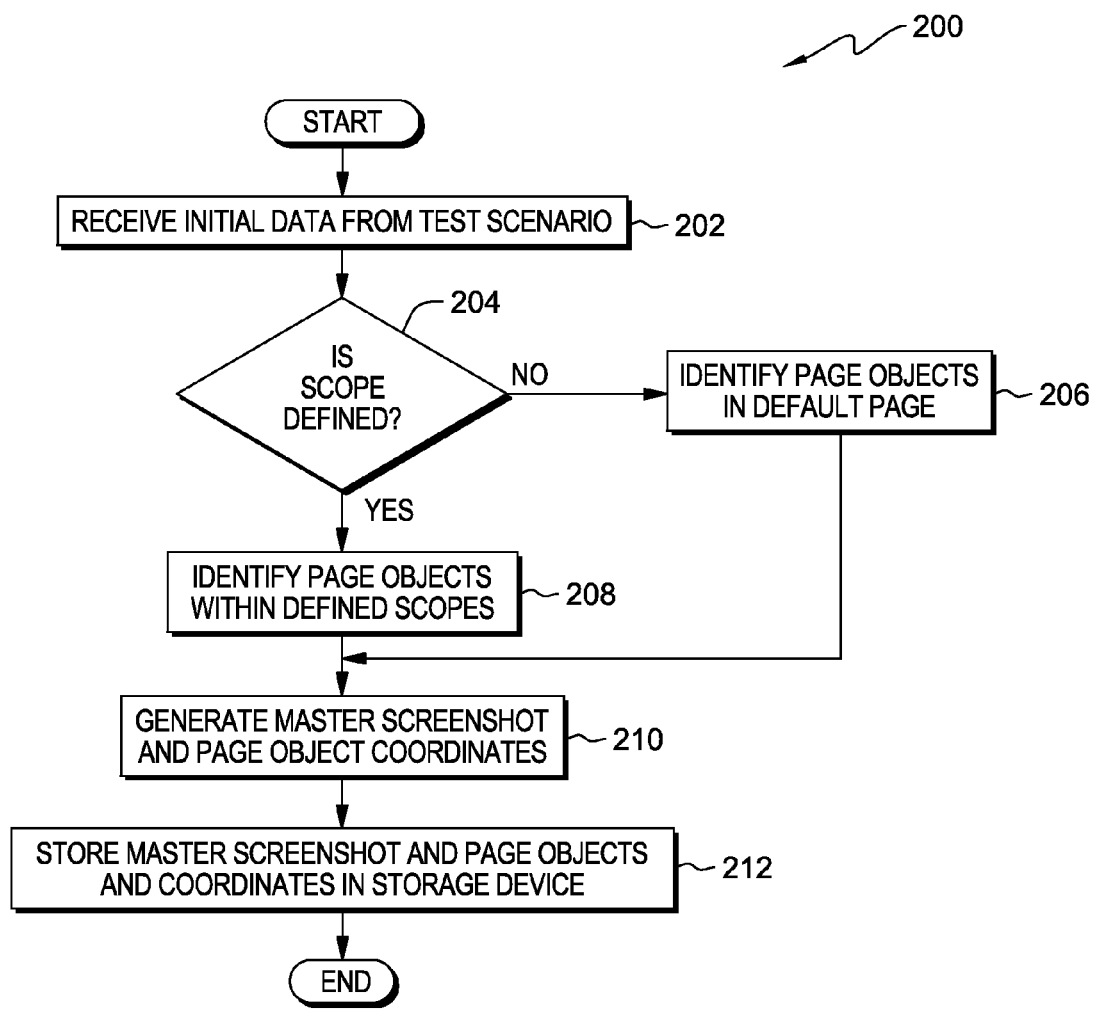
FIG. 2 is a flowchart depicting operational steps of a master mode of a screenshot verification program operating within the computing system of FIG. 1, for generating the initial verified control data to which all subsequent iterations of collected data are compared, in accordance with an embodiment of the present invention.

FIG. 2 is a flowchart depicting operational steps of master mode function 200, a function of screenshot verification program 120 executing within the computing system of FIG. 1, in accordance with an embodiment of the present invention. Master mode function 200 obtains initial control data to which subsequent iterations of collected data are compared, upon the execution of test scenario 118.

Test scenario 118 is a repeatable automated test procedure capable of accessing master mode function 200 and test mode function 300 at execution points within test scenario 118. In one embodiment, prior to execution of master mode function 200, test scenario 118 executes a series of commands, setting initial conditions. Initial conditions set computing device 110 and test page 114 to a defined configuration prior to initiation of screenshot verification program 120. Initial conditions within test scenario 118 are identified as, but not limited to, opening a Web browser, accessing a specific webpage, executing program code, and inputting anticipated information. After operations and test cases within test scenario 118 set initial conditions on test page 114, test scenario 118 executes master mode function 200. Test scenario 118 with respect to master mode function 200 is complete when master screenshot 122 is stored.

In step 202, master mode function 200 receives initial conditions upon initiation of a test scenario. In one embodiment, master mode function 200 receives a command to execute at the time a request initiates from user interface 112 on computing device 110 after user interface 112 establishes initial conditions. In another embodiment, master mode function 200 receives a command to execute, including initial conditions, at the time a request initiates from an automated process on computing device 110. In the current embodiment of the invention presented, computing device 110, via input through user interface 112 accesses test scenario 118 and automates the process for master mode function 200, thus expediting the webpage testing. In one embodiment, test scenario 118 sets the initial conditions for master mode function 200. In another embodiment, initial conditions could be executed through user interface 112 directly.

In decision 204, master mode function 200 determines if a page object with a scope were defined by the test scenario. Within a scope, there may be one or more page objects defined. In some embodiments, as part of the initial conditions, test scenario 118 may identify a scope that defines the outer boundaries of a section of a webpage as represented by page objects. In other embodiments, initial conditions may not identify a scope within test scenario 118. Additionally, in another embodiment, page objects may be defined but not have an associated scope.

If master mode function 200 determines page objects and scope information were provided as initial conditions by test scenario 118 (decision 204, yes branch), then master mode function 200 proceeds to step 208. If master mode function 200 determines the scope information for one or more page objects was not provided as initial conditions by test scenario 118 (decision 204, no branch), then master mode function 200 proceeds to step 206.

In step 206, master mode function 200 identifies the scopes for the page objects of test page 114. Initial conditions in test scenario 118 did not define the scopes of the page objects for use by master mode function 200. Master mode function 200 analyzes test page 114 in regards to the implementation of page objects and determines scopes. In some embodiments, master mode function 200 examines test page 114 for a document object model (DOM). A DOM is a cross platform and language independent tree structure convention that allows representation and interaction of and with objects within a webpage. The coordinate bounds of the DOM may infer the scope of the page object to be all possible page objects encompassed within test page 114. In some embodiments, the scope can be calculated by inspecting the implementation of the page object using the DOM application programming interface (API). The DOM API can identify the page objects and associated page elements within a page object via a uniquely defined tree structure of the parent element.

In step 208, master mode function 200 identifies page objects within the defined scopes. Master mode function 200 uses the provided scopes from test scenario 118 as the DOM element. The DOM element defines the outer bounds of the section the page objects represent. Master mode function 200 uses the DOM element and locates the coordinate bounds of the page objects by using standard browser technologies such as, but not limited to, XPath or Cascading Style Sheets (CSS).

In step 210, master mode function 200 generates a master screenshot and calculates page object coordinates. Each page object within the defined scope as identified by test scenario 118 or through user interface 112 is part of the existing screenshot on display, test page 114, and has a unique location. In some embodiments, test scenario 118 may not identify some page objects on test page 114. Master mode function 200 generates a partial screenshot to exclude unidentified page objects. In embodiments of the present invention, for each page object within the test page, a location is calculated using the DOM API. The DOM API can extract x and y coordinates of page objects on a webpage as indicated by the scope. In some embodiments, the upper left hand corner of a page object box is designated as the origin point for the x and y coordinates system. In addition to the origin point, the height and width of a page object may be extracted from test page 114 which can further define the bounds of the page object. The combination of the x-coordinates, y-coordinates, height, and width can define the scope location.

In step 212, master mode function 200, stores information pertaining to a master screenshot in a storage device such as storage device 116. Master mode function 200 stores information such as the master screenshot, defined page objects, and corresponding coordinates to master screenshot 122. Master mode function 200 will not overwrite master screenshot 122 until master mode function 200 is executed again. Storing master screenshot 122 in this manner preserves the integrity of the collected data for future verification testing upon the initiation of test mode function 300. Execution of the master mode function 200 is complete upon storage of master screenshot 122. An example of master screenshot 122 is depicted in FIG. 4A.

FIG. 3 is a flowchart depicting operational steps of test mode function 300, in accordance with an embodiment of the present invention. Test mode function 300 acquires new data from a test page after the implementation of updates. The new test data may be acquired to validate that the functionality of the test page remains intact as originally designed. Output results of test mode function 300 are compared with control data acquired by master mode function 200.

Test scenario 118 is a repeatable automated test procedure written by a user to access master mode function 200 and test mode function 300 at execution points within test scenario 118. In one embodiment, after master mode function 200 completes, and prior to test mode function 300 executing, test scenario 118 executes a series of commands updating initial conditions. Updated initial conditions refer to changes between initial conditions set at the start of master mode function 200 and the beginning of test function 300. Test scenario 118 updates may include, but are not limited to, opening a different Web browser, accessing an updated webpage, executing new program code, and inputting new information. In some embodiments, updates may encompass one or a combination of the aforementioned changes or another change not listed. After test scenario 118 updates test page 114, test scenario 118 executes test mode function 300. Test scenario 118 completes when test mode function 300 displays either a pass of failure report.

In step 302, test mode function 300 receives updated conditions upon continuation of a test scenario. In one embodiment, test mode function 300 receives a command to execute at the time a request initiates from user interface 112 on computing device 110 after user interface 112 establishes updated conditions. In another embodiment, test mode function 300 receives a command to execute, including updated conditions at the time a request initiates from within an automated process previously initiated on computing device 110. In the current embodiment of the invention presented, computing device 110, via input through user interface 112, accesses test scenario 118 and automates the process for test mode function 300, thus expediting the webpage testing. In one embodiment, test scenario 118 sets the updated conditions for test mode function 300. In another embodiment, updated conditions could be executed through user interface 112 directly.

In step 304, test mode function 300 accesses a master screenshot which includes page objects and corresponding coordinate information from storage device 116. Test mode function 300 accesses master screenshot 122 in storage device 116. Master screenshot 122 identifies and defines page objects and coordinate information to test mode function 300 for reacquisition.

In step 306, test mode function 300 generates new partial or full screenshots and page object coordinates for page objects identified within master screenshot 122. A partial screenshot is a section or portion of a full screenshot containing one or more page objects as identified within master screenshot 122. Partial screenshots may be separately stored screenshots pertaining to a single page object and a single set of coordinates within a webpage. In some embodiments, test scenario 118 defines a partial screenshot based on the scope. Test mode function 300 generates the partial screenshot of the specified section of a webpage and excludes the portions of a webpage not identified. In another embodiment, for page objects identified by master screenshot 122, test mode function 300 generates a partial screenshot for each identified page object and associated coordinates provided the page objects are located on test page 114. Test mode function 300 may store partial screenshots in test screenshot 124. Test mode function 300 does not generate a partial screenshot for unidentified page objects.

In decision 308, test mode function 300 determines if the master screenshot is the same size as the test screenshot. In some embodiments, page object coordinates of test screenshot 124 may differ from page object coordinates corresponding to the same page object in master screenshot 122 because elements in test page 114 outside the scope may change either size or location. In one embodiment of the invention, test mode function 300 determines the new test data (i.e., test screenshot 124) is identical in size to the stored control data (i.e., master screenshot 122), and proceeds to execute test mode function 300. In another embodiment of the invention, test mode function 300 determines new test data (i.e., test screenshot 124) and stored control data (i.e., master screenshot 122) are not the same size and require further processing. An example of test screenshot 124 is depicted in FIG. 4B showing changes in size and location of page objects as compared to an example of master screenshot 122 depicted in FIG. 4A.

If test mode function 300 determines master screenshot 122 page objects and test screenshot 124 page objects are the same size (decision 308, yes branch), test mode function 300 proceeds to step 312. If test mode function 300 determines master screenshot 122 page objects and test screenshot 124 page objects are not the same size (decision 308, no branch), test mode function 300 proceeds to step 310.

In step 310, test mode function 300 scales new page objects in test screenshot 124 to match the size of corresponding page objects in master screenshot 122. In one embodiment, a zoom function (e.g., of a Web browser) may enlarge or decrease the size of page objects, as depicted by the example in FIG. 4B. In another embodiment, a variance between Web browsers or operating systems causes another scaled version of the page objects. In each instance, test mode function 300 determines a scale factor between master screenshot 122 and test screenshot 124. Test mode function 300 applies the appropriate scale factor to test screenshot 124 page objects and coordinates, such that the size of the page objects and coordinates are identical or equal to master screenshot 122. Test mode function 300 updates test screenshot 124 with scaled page objects and coordinates. In the present embodiment, test screenshot 124 is stored in storage device 116. In another embodiment, test screenshot 124 is stored in some type of temporary memory (e.g., a cache of test data).

In step 312, test mode function 300 compares the master page objects with the test page objects. A comparison between master screenshot 122 and test screenshot 124 can be accomplished through various standard comparison techniques, such as image processing (e.g., pixelation, histogram, and red, green, blue (RGB) color model comparison). Image processing refers to the reading of an image by a computing device for the purpose of analyzing image characteristics. An image can be defined as a set of points (x,y) and an associated amplitude (e.g., brightness) for each point. Pixelation deconstructs images into the smallest element of an image (i.e., pixel) for comparison. A histogram graphically represents the distribution of data in an image and displays the information in categories for analysis or comparison. RGB color model comparison, utilizes a grid to evaluate an image based on the RGB triplet (r,g,b) with the color ranges being 0 to 1. Test scenario 118 can set a level of tolerance dependent on which comparison method is selected to account for variances and minor changes (e.g., color changes between computing devices, font smoothing, browser variance). In some embodiments when scaling was necessary (see step 310), test mode function 300 compares master page objects in master screenshot 122 with a scaled version of test screenshot 124. In another embodiment, test mode function 300 compares master page objects in master screenshot 122 with test screenshot 124 without scaling applied.

In decision 314, test mode function 300 determines if the results of the comparison between master screenshot 122 and test screenshot 124 are within an acceptable tolerance level specified by test scenario 118. In one embodiment of the invention, test mode function 300 determines that the results of the comparison between master screenshot 122 and test screenshot 124 are within acceptable tolerance levels, and the test passes. In another embodiment of the invention, test mode function 300 determines the results of the comparison between master screenshot 122 and test screenshot 124 are not within acceptable tolerance levels, and the test fails. A test failure is defined as a difference between the page objects beyond the acceptable tolerance level specified. In embodiments of the present invention, any variances to an updated test page outside of the defined scope and defined page objects are ignored and not part of the comparison and will not result in a test failure.

If test mode function 300 determines the results of the comparison between master screenshot 122 and test screenshot 124 are the same and within tolerance (decision 314, yes branch), test mode function 300 proceeds to step 318. If test mode function 300 determines the results of the comparison between master screenshot 122 and test screenshot 124 are not the same or outside set tolerances (decision 314, no branch), test mode function 300 proceeds to step 316.

In step 316, test mode function 300 provides a failure report. In one embodiment, a failure may result due to missing page objects, as depicted in FIG. 4C, example 440. In another embodiment, a failure may result due to results not meeting tolerances set in test scenario 118. In one embodiment of the invention, test mode function 300 displays failures by highlighting the changed page objects on test screenshot 124. In another embodiment, test mode function 300 displays failures in two separate screenshots with all the page objects displayed and differences are highlighted in the second image from test screenshot 124. In another embodiment, test mode function 300 displays only the portions of the page objects which fail. In yet another embodiment, test mode function 300 provides a report that may list text information about which page objects have failed. In another embodiment, test mode function 300 provides a text report that may display pass and failure status with respect to acceptable tolerance levels.

In step 318, test mode function 300 provides a pass report. In one embodiment, test mode function 300 indicates a pass by displaying a single screenshot image, without page objects highlighted. In another embodiment, test mode function 300 indicates a pass displaying a message stating the test has passed. In another embodiment, test mode function 300 displays a text report with the page objects noting a pass status. In another embodiment, test mode function 300 displays a text report depicting the results of the comparison in regards to the tolerance levels.

FIG. 4A depicts an example master screenshot, example 400, in accordance with one embodiment of the present invention. Master mode function 200 utilizes x and y coordinate system 402 to assign location coordinates to page objects within test page 114. Test scenario 118 identifies a page object referred to as login box (e.g., login box 406) that contains page elements, referred to as user id (e.g., user id 408) and password (e.g., password 410), to master mode function 200 (step 202). Master mode function 200 extracts page object and location information for login box 406 (step 210). Master mode function 200 stores login box 406 in master screenshot 122, storage device 116 (step 212). Test scenario 118 does not identify additional page objects to master mode function 200 as part of the defined scope. Master mode function 200 does not collect information on welcome 404, advertisement 412, advertisement 414, and footer 416 as part of master screenshot 122.

FIG. 4B depicts an example test screenshot with changes to size and location, example 420, in accordance with one embodiment of the present invention. Test mode function 300 utilizes x and y coordinate system 422 to assign location coordinates to page objects within test page 114. Master screenshot 122 passes page object and location information associated with login box 406 to test mode function 300 (step 304). Test mode function 300 locates login box 426 within test page 114. Test mode function 300 extracts page object and location information for login box 426, and page elements user id 428 and password 430 (step 306). Test mode function 300 stores login box 426 in test screenshot 124, temporarily. Test mode function 300 determines page objects login box 406 and login box 426 are not the same size (decision 308, no branch). Test mode function 300 scales login box 426 to the same size as the corresponding page object of master screen shot 122, login box 406 (step 310). Test mode function 300 stores the scaled page object, login box 426 in test screenshot 124. Master screenshot 122 does not identify additional page objects to test mode function 300 as part of the defined scope. Test mode function 300 does not collect information on welcome 424, advertisement 432, advertisement 434, and footer 436 as part of test screenshot 124.

FIG. 4B may also depict an example screenshot pass report, example 420, in accordance with one embodiment of the present invention. Test mode function 300 compares master screenshot 122 (FIG. 4A) with test screenshot 124 (FIG. 4B) (step 312). Master screenshot 122 contains a page object, login box 406 and page elements user id 408 and password 410. Test screenshot 124 contains a page object, login box 426 and page elements user id 428 and password 430. Test mode function 300 compares master screenshot 122 and scaled test screenshot 124 for identified page objects login box 406 and login box 426 and associated page elements user id 408 and user id 428, with password 410 and password 430 (step 312). In this embodiment, test mode function 300 determines master screenshot 122 and test screenshot 124 provide the same results, and correctly passes the comparison (decision 314). Test mode function 300 creates a visual pass report without highlighting of the page objects as shown in FIG. 4B (decision 314, yes branch step 316). Test mode function 300 does not report a failure on aspects outside of login box 426 despite changes, as test mode function 300 only compares page objects identified by master screenshot 122 and ignores remaining portions of test page 114.

FIG. 4C depicts an example test screenshot, example 440, which includes changes to location and missing page elements within a page object in accordance with one embodiment of the present invention. Test mode function 300 utilizes x and y coordinate system 442 to assign location coordinates to page objects within the test page 114. Master screenshot 122 passes page object and location information associated with login box 406 to test mode function 300 (step 304). Test mode function 300 locates login box 446 within test page 114. Test mode function 300 extracts page object and location information for login box 446 and page elements corresponding to user id 408 and password 410. In this embodiment, within the page object, login box 446, page elements user id, and password are not present in test page 114; therefore, page element values and locations can not be determined. Test mode function 300 stores login box 446 with a null set for user id and password page elements in test screenshot 124 (step 306). Test mode function 300 determines the page objects are the same size (decision 308) and does not scale test screenshot 124. Master screenshot 122 does not identify additional page objects to test mode function 300 as part of the defined scope. Test mode function 300 does not collect information on welcome 444, advertisement 452, advertisement 454, and footer 456 as part of test screenshot 124.

FIG. 4D depicts an example screenshot failure report example 460, in accordance with one embodiment of the present invention. Test mode function 300 compares master screenshot 122 (FIG. 4A) with test screenshot 124 (FIG. 4C) (step 312). Master screenshot 122 contains page object information for login box 406 with page elements user id 408 and password 410. Test screenshot 124 does not contain information for page elements identified as user id or password within the page object, login box 446. Test mode function 300 compares master screenshot 122 and test screenshot 124 for identified page objects login box 406 and login box 446 (step 312). In this embodiment, test mode function 300 determines that master screenshot 122 and test screenshot 124 do not provide the same results and fails the comparison (decision 314). Test mode function 300 creates a visual failure report as shown in FIG. 4D (decision 314, no branch step 316). In the present embodiment, test mode function 300 represents the failure of user id and password as a highlighted box with intersecting lines 468 within the page object, login box 466. Test mode function 300 does not report a failure on aspects outside of login box 466 despite changes, as test mode function 300 only compares page objects identified by master screenshot 122 and ignores remaining portions of test page 114, therefore welcome 464, advertisement 472, advertisement 474, and footer 476 remain unchanged.

Figure 5:
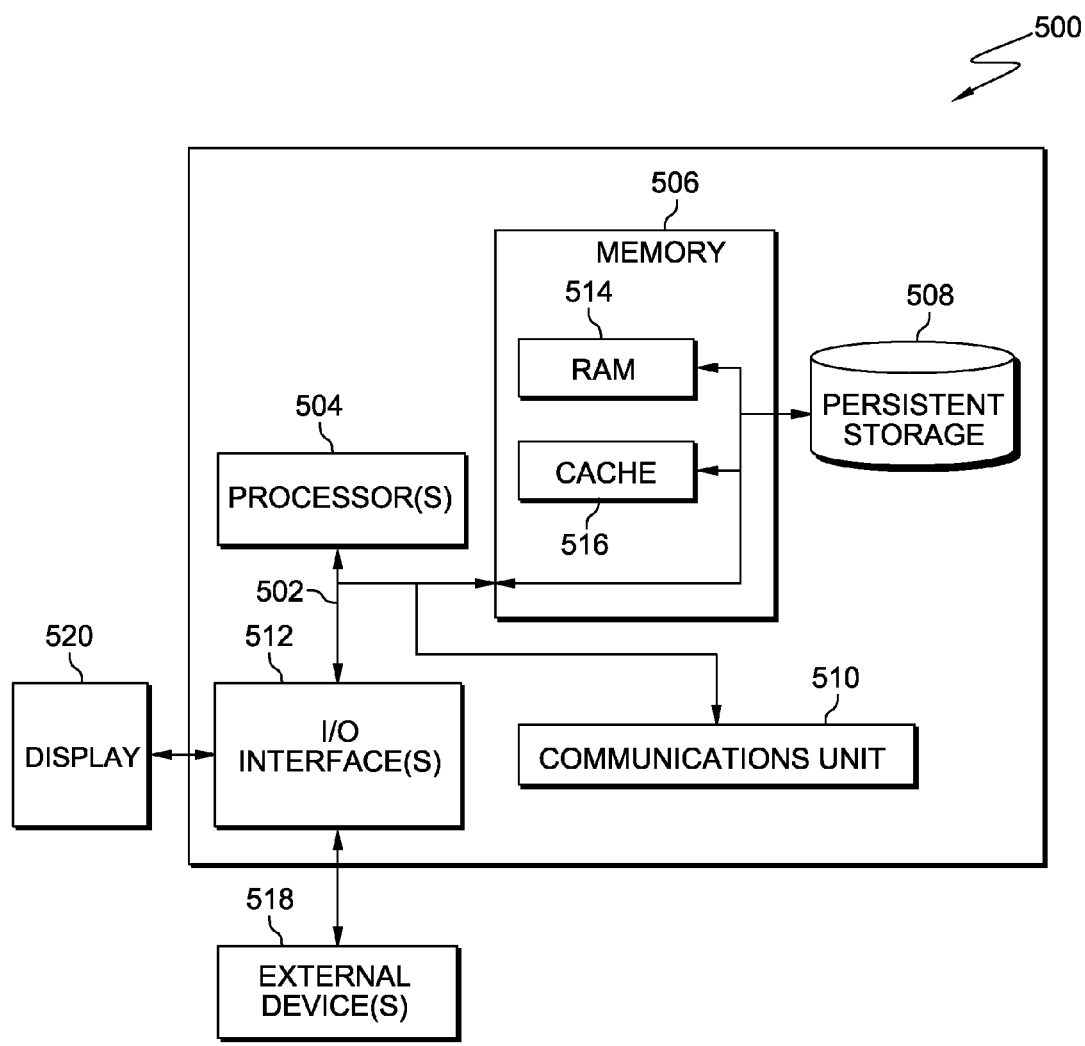
FIG. 5 is a block diagram of the components of the computing device, in accordance with an embodiment of the present invention.

FIG. 5 depicts a block diagram of components of computing device 500 which is representative of computing device 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Screenshot verification program 120, master mode function 200, test mode function 300, test page 114, test scenario 118, master screenshot 122, and test screenshot 124 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of an enterprise grid and client devices. In these examples, communications unit 510 includes one or more network interface cards. Communications unit 510 may provide communications through the use of either or both physical and wireless communications links. Screenshot verification program 120, master mode function 200, test mode function 300, test page 114, test scenario 118, master screenshot 122, and test screenshot 124 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., screenshot verification program 120, master mode function 200, test mode function 300, test page 114, test scenario 118, master screenshot 122, and test screenshot 124 can be stored on such portable computer readable storage media and can be loaded onto persistent storage 508 via I/O interface(s) 512. I/O interface (s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for comparing screenshots of an application interface, the computer program product comprising:
  one or more computer readable storage media and program instructions stored on the one or more computer readable storage media, the program instructions comprising:

program instructions to set initial conditions that include a specified Web browser, a specific webpage, execution of program code, and input information;
program instructions to identify a document object model based on the set initial conditions;
program instructions to define a scope based on the identified document object model, wherein the scope defines outer boundaries of a section of the specific webpage associated with one or more page objects;
program instructions to identify the one or more page objects within the defined scope;
program instructions to create a first screenshot based on the defined scope;
program instructions to store the first screenshot and the identified one or more page objects;
program instructions to update the set initial conditions, wherein the updated initial conditions include at least an update to the specified webpage;
program instructions to receive parameters of a test scenario, wherein the parameters include the first screenshot and the identified one or more page objects;
program instructions to generate a second screenshot based on the first screenshot for the updated initial conditions;
program instructions to identify one or more page objects within the second screenshot based on a scope of each of the identified one or more page objects associated with the first screenshot in the parameters of the test scenario;
program instructions to compare a section of the second screenshot that includes the identified one or more page objects of the second screenshot to a section of the first screenshot that includes the identified one or more page objects associated with the first screenshot that correspond to the identified one or more page objects included in the section of the second screenshot, wherein the section is a partial screenshot that represents a portion of a full screenshot;
program instructions to determine whether the section of the second screenshot matches, within a predetermined tolerance level, the section of the first screenshot; and
program instructions to provide a report based on the determination.

2. The computer program product of claim 1, wherein the program instructions to compare the section of the second screenshot to the section of the first screenshot, further comprise program instructions to:
determine that the section of the second screenshot is a different size than the section of the first screenshot;
determine a scale factor that corresponds to a difference in size between the section of the first screenshot and the section of the second screenshot; and
apply the determined scale factor to the section of the second screenshot to make the section of the second screenshot equal in size to the section of the first screenshot.

3. The computer program product of claim 1, further comprising program instructions to:
responsive to determining that the section of the second screenshot does match, within the predetermined tolerance level, the section of the first screenshot, provide a pass report.

4. The computer program product of claim 1, further comprising program instructions to:
responsive to determining that the section of the second screenshot does not match, within the predetermined tolerance level, the section of the first screenshot, identify an area within the section of the second screenshot that does not match, within the predetermined tolerance level, a corresponding area within the section of the first screenshot; and
provide a failure report that indicates the identified area that does not match.

5. The computer program product of claim 1, further comprising program instructions to:
determine coordinate locations, height, and width of the one or more page objects included in the section of the second screenshot.

6. The computer program product of claim 1, wherein portions of the first screenshot not included in the section of the first screenshot and portions of the second screenshot not included in the section of the second screenshot are excluded from the comparison of the section of the second screenshot to the section of the first screenshot.

7. The computer program product of claim 1, further comprising program instructions to:
identify a dynamically updating page object in the first screenshot and the second screenshot; and
exclude an area of the first screenshot and an area in the second screenshot corresponding to the identified dynamically updating page object from the comparison of the section of the first screenshot to the section of the first screenshot.

8. A computer system for comparing screenshots of an application interface, the computer system comprising:
one or more computer processors;
one or more computer readable storage media;
program instructions stored on the computer readable storage media for execution by at least one of the one or more processors, the program instructions comprising:
program instructions to set initial conditions that include a specified Web browser, a specific webpage, execution of program code, and input information;
program instructions to identify a document object model based on the set initial conditions;
program instructions to define a scope based on the identified document object model, wherein the scope defines outer boundaries of a section of the specific webpage associated with one or more page objects;
program instructions to identify the one or more page objects within the defined scope;
program instructions to create a first screenshot based on the defined scope;
program instructions to store the first screenshot and the identified one or more page objects;
program instructions to update the set initial conditions, wherein the updated initial conditions include at least an update to the specified webpage;
program instructions to receive parameters of a test scenario, wherein the parameters include the first screenshot and the identified one or more page objects;
program instructions to generate a second screenshot based on the first screenshot for the updated initial conditions;
program instructions to identify one or more page objects within the second screenshot based on a scope of each of the identified one or more page objects associated with the first screenshot in the parameters of the test scenario;

program instructions to compare a section of the second screenshot that includes the identified one or more page objects of the second screenshot to a section of the first screenshot that includes the identified one or more page objects associated with the first screenshot that correspond to the identified one or more page objects included in the section of the second screenshot, wherein the section is a partial screenshot that represents a portion of a full screenshot;

program instructions to determine whether the section of the second screenshot matches, within a predetermined tolerance level, the section of the first screenshot; and program instructions to provide a report based on the determination.

9. The computer system of claim 8, wherein the program instructions to compare the section of the second screenshot to the section of the first screenshot, further comprise program instructions to:

determine that the section of the second screenshot is a different size than the section of the first screenshot;

determine a scale factor that corresponds to a difference in size between the section of the first screenshot and the section of the second screenshot; and apply the determined scale factor to the section of the second screenshot to make the section of the second screenshot equal in size to the section of the first screenshot.

10. The computer system of claim 8, further comprising program instructions to:

responsive to determining that the section of the second screenshot does match, within the predetermined tolerance level, the section of the first screenshot, provide a pass report.

11. The computer system of claim 8, further comprising program instructions to:

responsive to determining that the section of the second screenshot does not match, within the predetermined tolerance level, the section of the first screenshot, identify an area within the section of the second screenshot that does not match, within the predetermined tolerance level, a corresponding area within the section of the first screenshot; and provide a failure report that indicates the identified area that does not match.

12. The computer system of claim 8, further comprising program instructions to:

determine coordinate locations, height, and width of the one or more page objects included in the section of the second screenshot.

13. The computer system of claim 8, further comprising program instructions to:

identify a dynamically updating page object in the first screenshot and the second screenshot; and exclude an area of the first screenshot and an area in the second screenshot corresponding to the identified dynamically updating page object from the comparison of the section of the first screenshot to the section of the first screenshot.

* * * * *